United States Patent

[11] 3,593,237

| [72] | Inventors | Moisei Abramovitch Lekhtman<br>ulitsa Pugacheva, 53, kv. 60;<br>Azik Iosifovich Perelberg, ulitsa Pushkina,<br>16, kv. 12; Tamara Yakovlevna Shraifeld,<br>ulitsa Florilor, 8/4, kv. 40, all of Kishinev,<br>U.S.S.R. |
|---|---|---|
| [21] | Appl. No. | 888,007 |
| [22] | Filed | Dec. 24, 1969 |
| [45] | Patented | July 13, 1971 |

[54] GALVANOMETRIC TRANSDUCER
1 Claim, 3 Drawing Figs.

| [52] | U.S. Cl. | 335/222 |
| [51] | Int. Cl. | H01f 7/08 |
| [50] | Field of Search | 335/222;<br>179/101, 115 |

[56] References Cited
UNITED STATES PATENTS

| 2,736,869 | 2/1956 | Rex | 335/222 |
| 2,866,138 | 12/1958 | Young | 335/222 |

Primary Examiner—G. Harris
Assistant Examiner—F. E. Bell
Attorney—Waters, Roditi, Schwartz & Nissen ABSTRACT: A galvanometric transducer having a movable system and an element operatively connected to this movable system, this element being positioned in a magnetic field and adapted to respond to variations of this magnetic field; this element has at least two current supply leads and at least two other leads, positioned in the magnetic field; in accordance with the herein disclosed invention, these at least two other leads extend parallel to he the vertical axis of the movable system and are fixedly attached to the movable system, at least two current supply leads of the element being positioned to one side of the horizontal central line of the movable system.

GALVANOMETRIC TRANSDUCER

The present invention relates to the field of instrument making, and, more particularly, it relates to galvanometric transducers which can be incroporated in measuring instruments and systems.

Known in the art are galvanometric transducers, which incorporate a permanent magnet, as a source of a magnetic field, a movable system and an element operatively connected to the movable system and adapted to respond to variations in the magnetic field, this element including, for example, a Hall electromotive force pickup.

A galvanometric transducer of this known type operates, as an amplifier of electric signals of low magnitude. An input signal is fed to the corresponding terminals of the frame of the movable system; direct current is fed to the current leads of the Hall electromotive force pickup, and an amplified signal is obtained across the potential leads of the Hall electromotive force pickup.

However, this known galvanometric transducer is not free from disadvantages. The movable system of this transducer is acted upon not only by the mechanical torque created by the electric current flowing through the frame, but also by a repelling force resulting from the interaction of the current flowing through pickup and of the current supply leads (the current terminals) of the pickup with the field created by the permanent magnet, as well as by a mechanical torque created by the potential leads of the pickup. The presence of these additional forces and of the additional mechanical torque, acting upon the movable system, is particularly unpleasant, when an effort is made to create a galvanometric amplifier of this known kind, which should be highly responsive and which should, therefore, feature a great amplification factor.

It is an object of the present invention to provide a highly responsive galvanometric transducer, which should have no additional mechanical forces and mechanical torque acting upon its movable system and affecting the performance thereof.

This object is accomplished in a galvanometric transducer comprising a source of a magnetic field and a movable system, said movable system having operatively connected thereto an element responsive to variations of said magnetic field, said element having at least a pair of current supply leads and at least two other leads, positioned in said magnetic field, said movable system having a vertical axis of rotation and a horizontal central line, in which galvanometric transducer, in accordance with the present invention, said at least two other leads of said element extend substantially parallel to said vertical axis of rotation of said movable system and are fixedly attached to said movable system; said at least a pair of current supply leads of said element being positioned to one side of said horizontal central line of said movable system.

The present invention will be better understood from the following detailed description of a preferred embodiment thereof, with due reference being made to the accompanying drawings, wherein.

Figures 1, 2, 3:
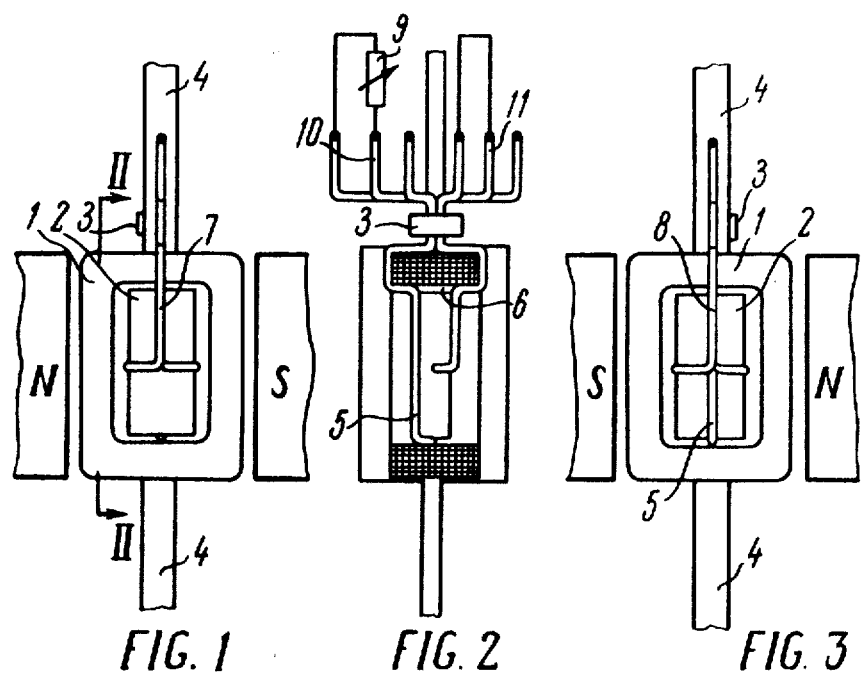
FIG. 1 is a schematic representation of a galvanometric transducer, constructed in accordance with the present invention (front elevation)
FIG. 2 is a cross-sectional view taken along line II-II of FIG. 1.
FIG. 3 is a rear elevation of the galvanometric transducer represented in FIG. 1.

Referring now in particular to the appended drawing, a galvanometric transducer, embodying the present invention, comprises a movable system including a frame 1 (FIG. 1) carrying a pickup 2 and a mirror 3. The movable system is mounted for rotation about a vertical axis on a pair of opposing spindles 4, the system being positioned in a magnetic field.

The movable system of the herein disclosed galvanometric transducer may incorporate, as its member responsive to variations of the magnetic field, i.e., as its pickup 2, either a Hall electromotive force pickup, or a Gauss element, or else a magnetic diode, or some other appropriate known device.

In the herein disclosed embodiment of the present invention the pickup 2 is a Hall EMF pickup.

The current leads 5 and 6 (FIGS. 1 and 3), i.e., the power supply leads of the pickup 2 extend strictly along the vertical axis of the movable system and are directed to one side of the horizontal central line thereof.

The potential leads 7 and 8 (FIGS. 1 and 3) of the system are arranged at both sides of the vertical axis of the pickup 2; they extend toward the central point of the pickup 2 perpendicularly to the vertical axis of the system, and from that central point they extend parallel to the vertical axis of the system, to one side of the horizontal central line thereof.

All the above-mentioned leads of the pickup 2 are attached to the movable system of the transducer within an area subjected to the action of the magnetic field; the current lead 5, which extends along one of the sides of the pickup 2, should be finally attached to the movable system only after preliminary testing of the transducer and, if need be, after a balancing operation in the magnetic field.

The above-mentioned leads of the pickup 2, arranged and oriented as it has been described above, make up together two single-turn coils, directed perpendicularly to the magnetic lines of the field. The movable system of the transducer and the pickup 2 carried thereby are so arranged relative to the magnetic field, that in a zero position of the transducer the plane of the pickup 2 is indexed along the magnetic field. The potential leads 7 and 8 of the pickup 2 are electrically connected through a resistor 9 (FIG. 2) to the respective output terminals 10 and 11 of the frame 1.

The herein disclosed galvanometric transducer, embodying the present invention, operates, as follows.

When electric current flows through the current leads 5 and 6 of the pickup 2, which leads form together with the pickup a coil arranged perpendicularly to the magnetic field, there are generated repelling forces which act upon both half-turns of the coil, and thus annihilate each other. The repelling forces applied to the two half-turns of the coil formed by the potential leads 7 and 8 annihilate each other in a similar way.

Thus, when current flows through the electric current leads 5 and 6 of the pickup 2, the movable system of the transducer will orient itself in the magnetic field so, that the plane of the pickup 2 becomes parallel to the magnetic lines of the field. Then, if a mechanical corrector device (not shown in the drawings) is provided, it becomes possible to bring together, or match the mechanical and the electrical zero positions of the movable system, for example, by using the mirror 3 for the purpose.

When the movable system is rotated about the vertical axis thereof, and electric current is supplied to flow through the coil formed by the current leads 5 and 6 of the pickup 2, there is produced a mechanical torque applied to the system, the value of this torque being proportional to the angle of rotation of the system from the zero position thereof. This torque applies a feedback effort to the movable system.

Simultaneously, a mechanical torque is applied to the coil formed by the potential leads 7 and 8 of the pickup 2, in a way similar to that already described. Then it becomes possible to compensate, or counterbalance the above-mentioned feedback effort by directing a portion of the current flowing through the potential leads 7 and 8 via the resistor 9 to the output terminals 10 and 11 of the frame 1, in corresponding polarity.

However, the presence of a negative feedback effort, for example, may be essential in certain cases for improving the vibration stability of the operation of a galvanometric transducer.

It is now clear that the present invention provides for creating highly responsive galvanometric transducers. Moreover, in a galvanometric transducer, constructed in accordance with the present invention, any influence of unwanted additional forces upon the movable system is eliminated, whereby the operational error of the transducer is minimized. In a transducer, constructed in accordance with the present invention, the plane of the pickup is arranged parallel to the magnetic lines of the field in a zero position of the transducer. Moreover, the present invention helps to solve the problem of constructing a galvanometric transducer featuring high vibration stability of its performance.

What we claim is:

1. A galvanometric transducer comprising a source of a magnetic field and a movable system positioned in said magnetic field, said movable system having a vertical axis thereof and a horizontal central line thereof, said movable system being mounted for rotation about said vertical axis thereof; an element operatively connected to said movable system, said element being also positioned in said magnetic field and being responsive to variations of said magnetic field, said element including at least a pair of current supply leads and at least two other leads, said at least two other leads extending substantially parallel to said vertical axis of said movable system (and being fixedly attached to said movable system), said at least two current supply leads being positioned to one side of said horizontal central line of said movable system.